P. J. JOHNSON.
FEEDING TABLE FOR DUPLEX BOX NAILERS.
APPLICATION FILED APR. 10, 1915.

1,236,842.

Patented Aug. 14, 1917.
6 SHEETS—SHEET 1.

Fig. 1.

Witnesses
L. B. James
Dorothy Lusby

Inventor
Peter J. Johnson
By Geo W Dues
Attorney

P. J. JOHNSON.
FEEDING TABLE FOR DUPLEX BOX NAILERS.
APPLICATION FILED APR. 10, 1915.

1,236,842.

Patented Aug. 14, 1917.
6 SHEETS—SHEET 4.

Witnesses
Geo. B. Jaines
Dorothy Lusby

Inventor
Peter J. Johnson
By
Geo. W. Bells.
Attorney

P. J. JOHNSON.
FEEDING TABLE FOR DUPLEX BOX NAILERS.
APPLICATION FILED APR. 10, 1915.

1,236,842.

Patented Aug. 14, 1917.
6 SHEETS—SHEET 6.

Witnesses
L. B. James
Dorothy Lusby

Inventor
Peter J. Johnson
By 
Attorney

UNITED STATES PATENT OFFICE.

PETER J. JOHNSON, OF PETERSBURG, VIRGINIA.

FEEDING-TABLE FOR DUPLEX BOX-NAILERS.

1,236,842.  Specification of Letters Patent.  Patented Aug. 14, 1917.

Application filed April 10, 1915. Serial No. 20,370.

*To all whom it may concern:*

Be it known that I, PETER J. JOHNSON, a citizen of the United States, and a resident of Petersburg, in the county of Dinwiddie and State of Virginia, have invented certain new and useful Improvements in Feeding-Tables for Duplex Box-Nailers, of which the following is a specification, reference being had to the accompanying drawings.

This invention relates to certain new and useful improvements in duplex nailing machines, and comprises a feeding mechanism, by means of which a box end and two cleats are automatically fed below the hammers, insuring the cleats being secured in exact alinement with the ends of the box end and ending flush with or projecting beyond the edges thereof, as may be desired; and the primary object of the invention is to provide a duplex nailing machine with an automatically operating feeding mechanism, which will feed from suitable hoppers, assembled box ends, and cleats to the nailing machine, where the two cleats are simultaneously secured and from which they are successively delivered.

A further object of my invention is to provide a feeding table attachment to a duplex box nailing machine, so arranged that the stock forming a box end and two cleats will be simultaneously fed below the nailer, the invention including a stock hopper and two cleat hoppers.

Another object is to provide a feeding machine of the character described, including a stock hopper from which the stock is fed into a cleat hopper. From this cleat hopper the assembled stock and the cleats are advanced to the nailing table, where the cleats are held securely to the stock, while being secured by the automatic duplex nailer.

A still further object is to provide a duplex feeding mechanism for a duplex nailing machine, so arranged that two cleats longer than the width of the box ends can be simultaneously secured to the box ends.

With these and other objects in view the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification, and in which like numerals of reference indicate similar parts in the several views.

In the manufacture of wooden boxes, the cleat ends are the most expensive factor in the construction of the boxes. Ordinarily the stock and cleats are fed to the nailer by hand, which is a time consuming operation. Further there are two styles of cleat box ends. The first kind has the cleats as long as the width of the box ends. The other kind, however, has the cleats projecting beyond each edge of the box ends, and it is a difficult matter to accurately hold these cleats to the stock while being secured.

In my present invention I provide a duplex feeding mechanism, in which the stock and cleats are simultaneously fed below the nailing hammers, the construction being such that cleats ending flush with the box edges may be accurately secured, as well as providing a means whereby cleats longer than the width of the box ends can be accurately held to the stock while being nailed. My invention further embodies certain novel features described more fully hereinafter.

In carrying out the aim of my invention I employ a rectangular base frame 1. The longitudinal members of this frame are provided with the upstanding rails *a*, shown in Figs. 1 and 3, and slidably held upon these rails are the sliding carrying frames 5 and 6 provided, respectively, with the carrying standards 7 and 8, as clearly shown in Fig. 4. The sliding frame 5 is provided with the bearing yokes 9 and 10, while the frame 6 is provided with the bearing yokes 11 and 12.

Figure 3:
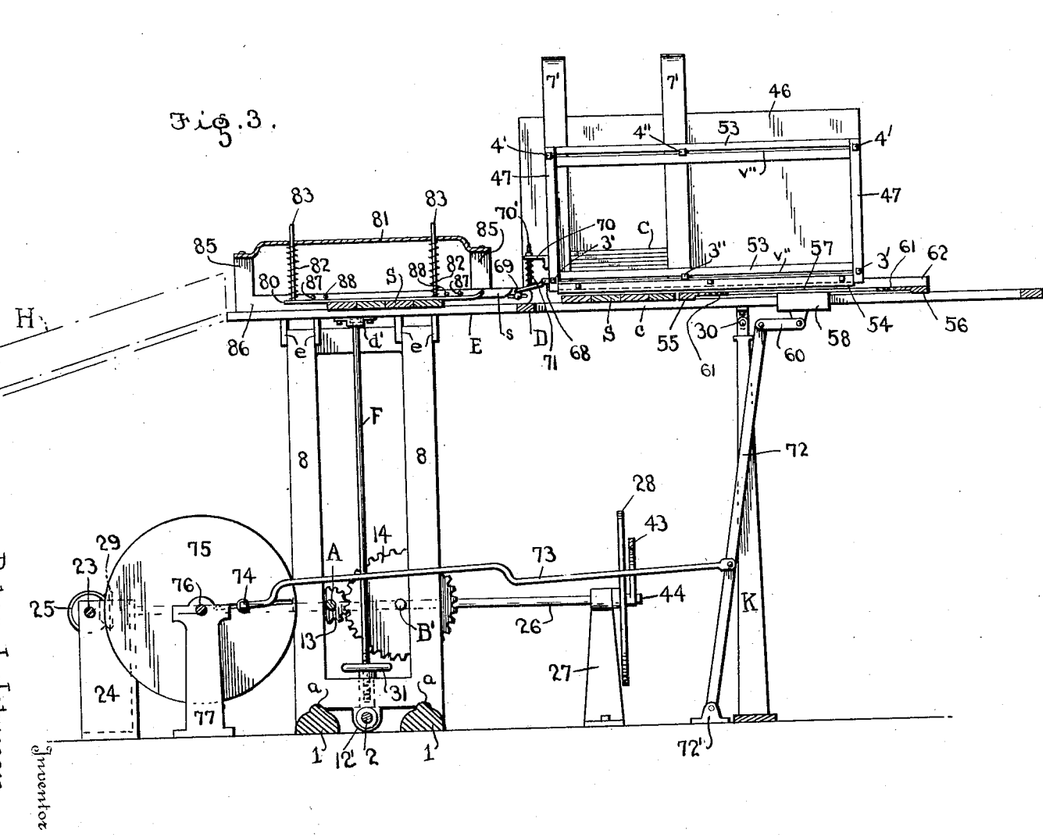
Fig. 3 is a section on line 3, 3 of Fig. 1, the exit chute being shown in dotted lines.

Passing through the frame 1, as shown in Fig. 3, is the threaded shaft 2, and this threaded shaft at its end is provided with a pawl lever 3, arranged to operate in connection with the ratchet 4, so that this shaft 2 may be rotated by hand in either direction. The standards 7 and 8 are each provided with a threaded ear 12', one of these ears being shown in Fig. 3, and the threaded portions of the shaft 2 are held within the ears 12', enabling these standards 7 and 8 being carried away from or toward one another.

Figure 1:
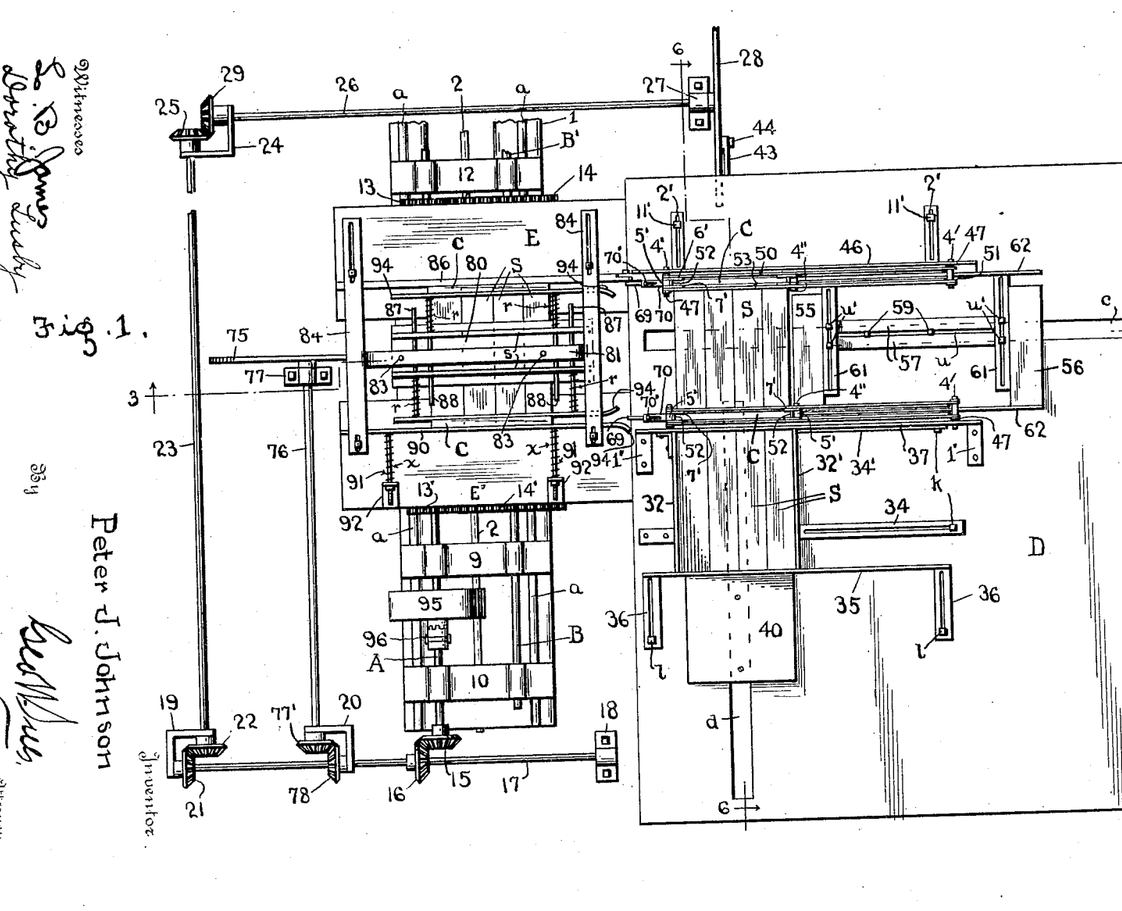
Figure 1 shows a top view of a duplex nailing table showing my feed table attached with parts broken away, the exit chute being shown in dotted lines.
Figure 2:
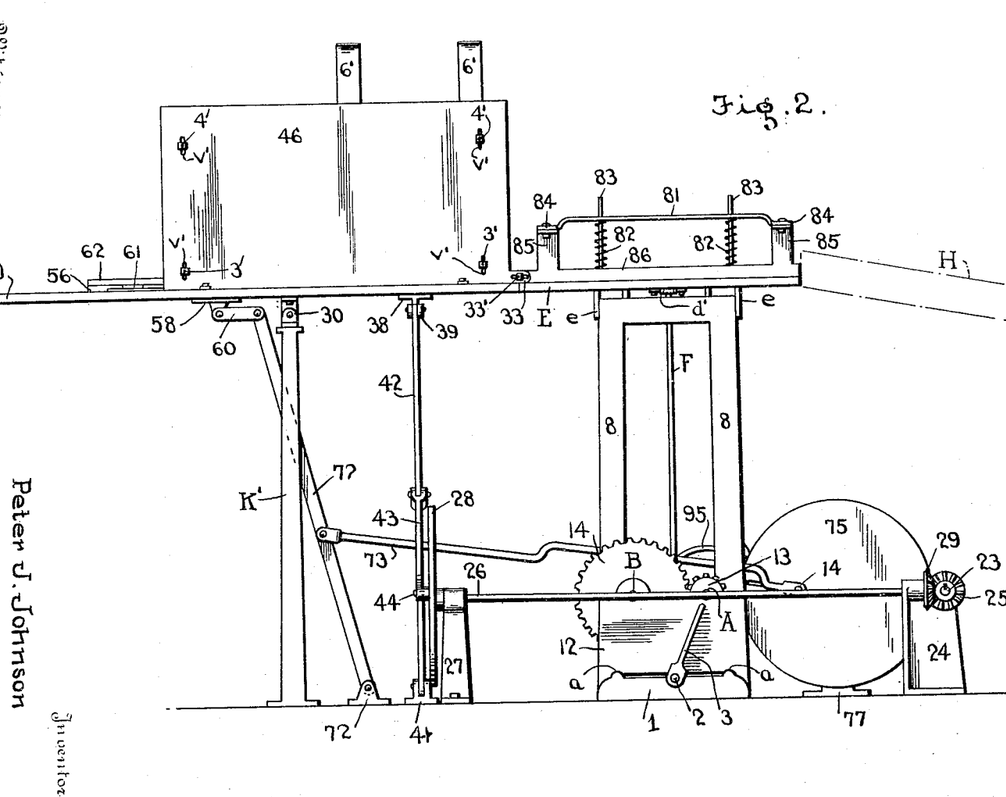
Fig. 2 shows a side elevational view, with parts removed.

Mounted within the yokes 9, 10, 11 and 12 is the main driving shaft A, shown in Figs. 1, 2 and 3, this shaft A being provided with the spur gears 13 and 13' meshing, respectively, with the spur gears 14 and 14' carried upon the stub shafts B' and B, these shafts also being revolubly held within the yokes as shown. Every movement imparted to the main driving shaft A is transmitted through the spur gears to the stub shafts B and B'. As these bearing yokes slide backward and forward, it should be understood that the main driving shaft A remains stationary.

At one end the shaft A is provided with the bevel pinion 15, which meshes with the bevel pinion 16, fixed to the counter-shaft 17, held within the bearing post 18 and the duplex bearing posts 19 and 20, this construction being clearly shown in Fig. 1.

Further secured to the counter-shaft 17, adjacent to the duplex bearing posts 19 and 20, are the bevel gears 21 and 78, the gear 21 meshing with the gear 22 fixed to the shaft 23, which at its remaining end is carried within the duplex bearing post 24, and is provided with the bevel gear 25, which meshes with a bevel gear 29, fixed to the disk shaft 26, which is held at its other end within the bearing post 27, the disk 28 being secured to the end of the shaft 26, outside of the bearing post, as clearly shown in Fig. 1.

Figures 4, 5:
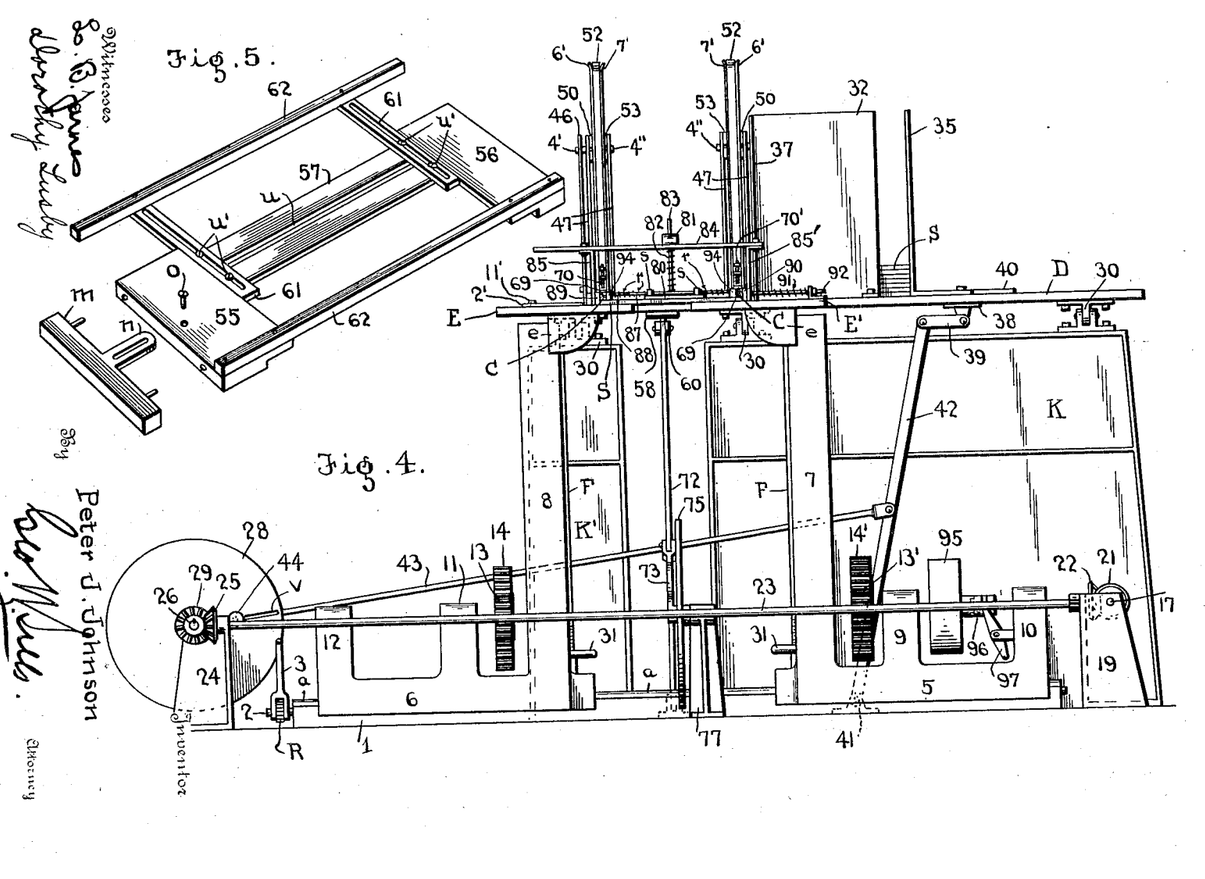
Fig. 4 is a front elevational view.
Fig. 5 is a perspective view of the adjustable stock and cleat ejector, showing the location of the auxiliary head *m*.

Extending upward and held within the upper end of each ear 12', as shown in Fig. 3, is a supporting shaft F, these shafts being threaded at their lower ends, each being provided with an adjusting hand wheel 31. These shafts F may be raised and lowered. Two such shafts are employed, as shown in Fig. 4. At their upper ends each shaft F works within a collar d', and these collars are secured to the underfaces of the two-part nailer tables E and E'. In Fig. 1 a top view of the two nailer tables may be seen, while in Fig. 4 is shown an end view of these two nailer tables, which are held in parallel spaced relation.

These nailer tables are adjustably secured to the supporting arms of the duplex nailing machine, the lower ends of the arms being fixed to the standards 7, 7 and 8, 8. As the nailing machine forms no part of my invention, the hammers and nail magazines, located above the tables E and E', and the remaining nailer mechanism has not been shown in the drawings.

As clearly shown in Fig. 3, each nailer table E and E' is provided with a plurality of downwardly extending guide sleeves e, which work adjacent to the standards 8, 8 and 7, 7, and so hold these nailer tables horizontal to insure a true vertical movement in these tables.

From the foregoing it will be understood that I provide a base frame upon which are adjustably held two standards, and that these standards each carry a section of a nailing table.

Figure 6:
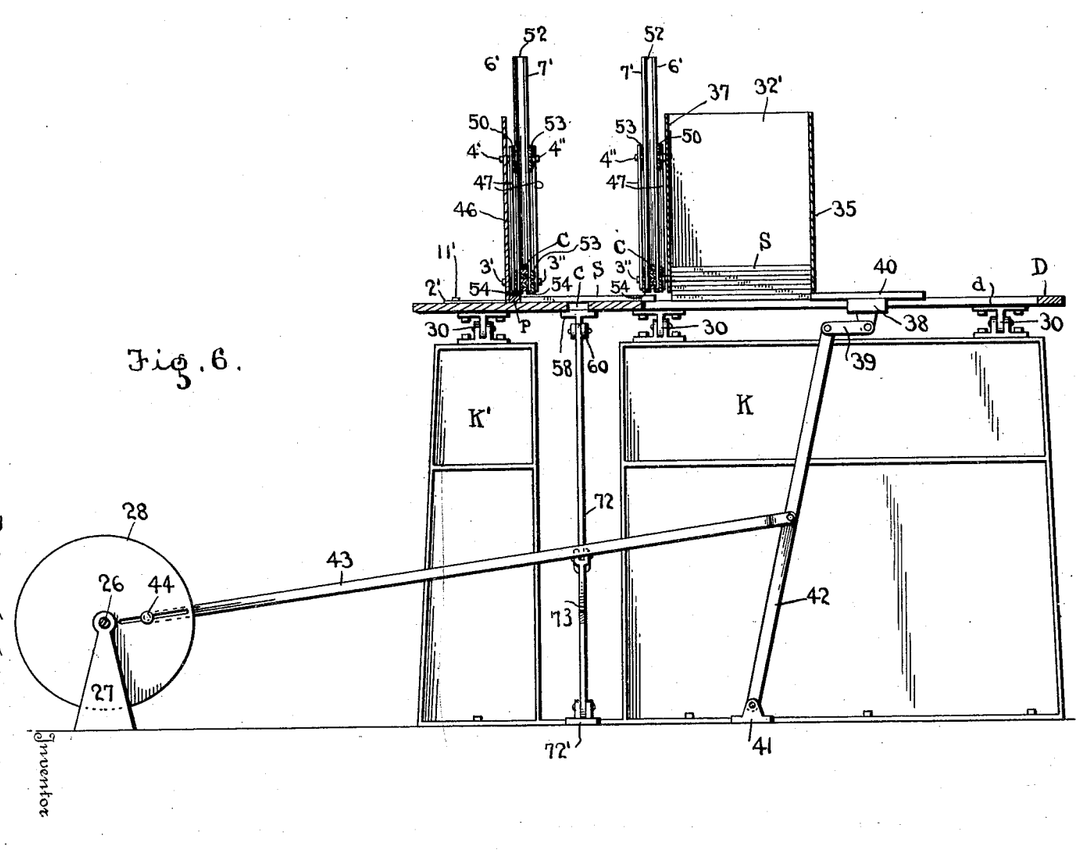
Fig. 6 is a section on line 6, 6 of Fig. 1.

Held parallel to the base frame 1 are the two stands K and K'. These stands, as shown in Fig. 6, are held in spaced relation, and each is provided upon its upper edge with a hinge 30, these hinges 30 giving pivotal support to the slotted feed table D. As shown in Fig. 2 the tables E and E' and D are held parallel to one another. This is necessary in order to insure the stock freely sliding from the feed table upon the nailer tables. As shown in Fig. 1 the feed table D has a longitudinally extending slot c and a transversely extending slot d. The table D is very much wider and longer than the nailer tables E and E', as this table D gives support to the stock hopper as well as the two cleat hoppers.

Secured to the slotted feed table D is the adjustable stock hopper, comprising the outer fixed side 32, shown clearly in Figs. 1 and 4, and secured parallel to this side 32 is the adjustable side 32', which has the slotted arm 34 and the slotted arm 34', these slotted arms 34 and 34' being secured by means of the set bolts k. As shown in Fig. 1, the bolt k securing the arm 34' passes through the hopper end 37, this hopper end being secured by means of the ears 1'.

Held parallel to the hopper end 37 is the adjustable hopper end 35, having the slotted adjusting arms 36, secured by means of suitable bolts 1. From the foregoing it will be seen that I provide a hopper having two fixed members 32 and 37, while the remaining members 32' and 35 are adjustable. This admits stock of any length and width being inserted within the hopper.

The hopper ends 35 and 37 are provided with suitable access openings, as shown in Fig. 6, through which the stock and the feed plate 40 pass. The plate 40 serves as an ejector in shoving the assembled stock members forming the box end out of the stock hopper into the cleat hopper. The movement of this feed plate 40 is secured through the intermedium of the rock lever 42, which by means of the link 39 is pivotally connected to the ear 38, fixed to the underface of the feed plate 40. This lever 42, which is secured to the bearing 41, has imparted to it a backward and forward rocking movement, in that the connecting rod 43, secured at one end to this lever 42, is also secured to the wrist pin 44, adjustable held within the slot $v$, formed within the disk 28, which has been described as being secured to the shaft 26. By means of the adjustably held wrist pin 44, the incursion of the feed plate 40 can be accurately regulated, so that stock of any desired length can be fed out of the stock hopper into the cleat hopper.

In Fig. 4 I have shown the adjustable hopper end 35 as carried away from the side 32, showing a larger size of stock in the hopper than is shown in Fig. 1.

In the last mentioned figure the box end is shown as comprising four different stock sections. These box ends may comprise two or more sections. They are all properly assembled and loosely arranged in the hopper from which the stock sections are successively removed by means of the feed plate 40, which acts as an ejector in the manner described.

Figures 8, 9:
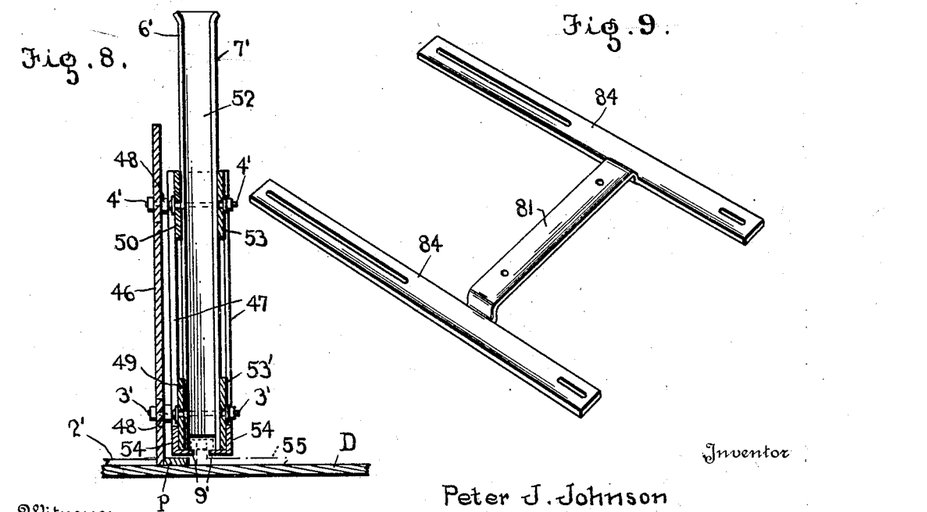
Fig. 8 is a section on line 8, 8 of Fig. 7.
Fig. 9 shows a perspective view of the spanner frame.

From the stock hopper the stock is fed outward until the same encounters the stop bar $p$, shown in Fig. 6, which is secured to the lower edge of the adjustable plate 46, which is provided with the slotted arms $2'$, through which pass suitable bolts $11'$ to adjustably hold this plate 46 as disclosed. In Fig. 8 a cross sectional view of this adjustable plate 46 is shown.

Secured to the plate 46 is one of the cleat hoppers, while the remaining cleat hopper is supported by means of the hopper end 37. As both of these hoppers are exactly alike with the exception that one is stationary and the other may be adjusted, the adjusted cleat hopper will be described, it being understood that the stationary hopper is exactly alike in construction, and is secured in a like manner to the hopper end 37.

Each cleat hopper, first, comprises two sets of straps 47, which are vertically secured. These straps are held upon the upper and lower bolts $4'$, $3'$ and $4''$, $3''$ in parallel spaced relation, being spaced from the plate 46, by means of the washers 48. Held upon the bolts $3'$ and $4'$, and interposed between the straps are the spacing blocks 51.

Figure 7:
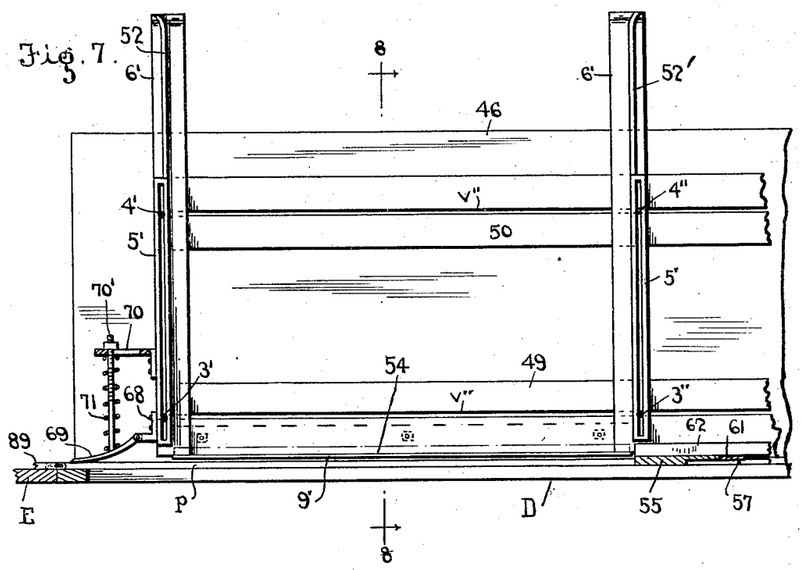
Fig. 7 is a section through the table D with one side of a cleat hopper removed, and parts broken away.

Secured to the straps 47 are the slotted guide bars 50 and 49 upon one side, as shown in Fig. 7, and 53 and $53'$ upon the opposite side as shown in Fig. 8. Slidably held within the slot $v''$, as shown in Fig. 7, are the bolts $4''$ and $3''$ intermediate of the ends of the slotted bars, while at their ends the slots $v''$ contain the bolts $3'$, $3'$ and $4'$, $4'$, which support these plates 49 and 50 and 53 and $53'$ at their ends. It is not intended that the end bolts should be adjustable. The intermediately positioned bolts $3''$ and $4''$ are, however, adjustable within their slots as is shown in Fig. 3.

Carried upon the forward bolts $4'$ and $3'$ are the forward cleat hopper plates $6'$ and $7'$, while carried upon the slidably held bolts $3''$ and $4''$ are the rear sliding cleat hopper plates $6'$ and $7'$, shown in Fig. 8, while clamped between each set of plates $6'$ and $7'$ are the hopper ends 52, which are held a suitable distance above the upper faces of the flange edges $9'$, as shown in Fig. 8, to permit the escape of a cleat out of the hopper. In order that these hopper ends 52 may be adjustably held, they are each provided with a slotted enlargement $5'$, as shown in Fig. 7, and it is within the slots of these enlargements that the bolts are held in the manner shown. In Fig. 7 the hopper end 52 is shown as raised a suitable distance sufficient to permit the entry of the cleat ejecting rails 62, which form a part of the ejector employed in carrying the assembled box ends and cleats out of the cleat hopper upon the nailer table below the hammers. As shown in Fig. 8 the straps 47 are used in sets of twos, as are the supporting flanges 54.

From the foregoing it will be understood that the cleat hoppers comprise a plurality of alined plates $6'$ and $7'$, which are held in spaced relation according to the width of the cleat as the hopper ends 52 and the spacing blocks 51 must be adjusted each time the width of the cleat is changed. The adjustable hopper end $52'$ is carried away from or toward the fixed hopper end 52, according to the length of cleat used in connection with the sectional box end.

In order to hold the cleats to the box ends I employ two presser feet 69, to each of which is pivotally secured an ear 68, fixed to each forward hopper end enlargement $5'$, as shown in Fig. 7. Located above each ear 68 is a slotted bracket 70, while secured to each presser foot 69 is a stem $70'$, passing through a slotted bracket 70, and being provided with a spring 71, insuring the presser feet 69 holding the cleat down upon the stock box ends as the same pass upon the nailing table.

As the width of the box ends is changed, so must the distance between the two cleat hoppers be changed, so that every time the adjustable hopper end 35 is carried outward to accommodate a new end, the adjustable carrying plate 46 must be carried out a like distance in an opposite direction, but these adjustments are made possible as described, through the intermedium of the slotted arms 36 and 2'. The changing of the position of the cleat hoppers makes it necessary to provide an ejector having adjustable members, and in my present invention I provide an adjustable ejector which can be arranged to any width of box end, while further being provided with a head enabling the operator to provide the box ends with projecting cleats or cleats having their ends flush with the upper and lower edges of the box ends.

Fig. 5 shows an enlarged sectional detail of the ejector employed to advance the assembled stock section and shove the cleats out of their hoppers under the adjustable holder, which securely holds the box ends and cleats while the cleats are being nailed to the stock.

As shown in Fig. 5 the ejector comprises a front head 55 and a rear head 56, these heads being connected by means of the slotted plate 57, having the slot $u$. This slot $u$ is necessary in order to receive the bolts 59, shown in Fig. 1, by means of which the ejector is secured to the head 58, which head slides within the slot $c$. As shown in Fig. 5 the heads 55 and 56 are connected at one end by means of a rail 62, which forms the cleat ejector arranged to reciprocate within the stationary cleat hopper located adjacent to the stock hopper as described. The opposite cleat ejector 62, arranged to reciprocate within the adjustably held cleat hopper, is provided with the slotted arms 61, which arms are secured to the plate 57, by means of the bolts $u'$. When the cleats are of a length so that they end flush with the edges of the box ends, the forward edge of the front head 55 ends flush with the forward ends of the cleat ejector rails 62. However, when the cleats are to project, say one-half of an inch, beyond the edges of the box ends, the forward head 55 is provided with an auxiliary head $m$, which is advanced a distance equal to the distance the cleats are to project, so that the box ends are shoved that much farther than are the cleats, so that in adjusting the head $m$, the projecting end of the cleat can be nicely regulated. This is possible in that the head $m$ is provided with the slotted stem $n$, which is held to the head by means of the bolt $o$.

A forward and rearward movement is imparted to the adjustable ejector by means of the rock bar 72, more clearly shown in Fig. 3, which at its lower end is secured to a bearing ear 72', and has secured to it the crooked connecting rod 73, which at its other end is secured to the wrist pin 74, adjustably held within a slot of the disk 75. The crook in the rod 73 is necessary because this rod passes over the shaft A, as shown in Fig. 3. The disk 75 is secured to the shaft 76, held within the bearing post 77 and the duplex bearing post 20, as clearly shown in Fig. 1. This shaft 76 is driven by means of the bevel pinion 77', meshing with the bevel pinion 78, secured to the shaft 76.

The shafts 76 and 26 are so timed that there will be no interference between the ejecting feed plate 40 and the adjustable ejector.

From the foregoing it will be understood that the stock hopper is filled with a suitable number of box end sections of a proper width and length, and that each cleat hopper is then also filled. The lowermost cleats within their hoppers rest upon the flange edges 9' above the face of the table D. The machine is then started, so that the feed plate 40 will engage the lowermost assembled stock members and feed them forward below the cleat hoppers, the box ends being stopped against the bar $p$. The next action is the operation of the box end and cleat ejector, which results in the box end and two cleats being simultaneously advanced from between the cleat hoppers directly under the hammers of the duplex nailers, the cleats being held to the box ends before being introduced into the holder by means of the shoes 69.

The holding mechanism employed to hold the stock members and cleats against casual displacement during the operation of hammering comprises two separate members, one being secured to the nailer table E, and the other to the nailer table E', as more clearly shown in Fig. 1, while the arrangement is also clearly illustrated in Fig. 4.

In holding the box ends to the tables I employ a centrally positioned shoe 80. This shoe is in the form of a plate having the end toward the cleat hoppers curved upward, as shown in Fig. 3, and is provided with the upstanding stems 83, holding the springs 82, the stems passing through the spanner bar 81, as shown in Fig. 3, so that this shoe is always pressed downward. The spanner bar 81 is provided with the slotted arms 84, which are secured to the posts 85 upon one side, projecting from the fixed guide flange 86, secured to the table E, more clearly shown in Fig. 2. The guide flange 86 is set in accurate alinement with the adjustable plate 46, this plate 46 being provided with a slotted ear 33, through which a bolt 33' passes pivotally securing the plate 46 to the flange 86. Upon the opposite side I employ a yieldingly held adjustable guide rail 90, which is arranged in alinement with the inner face of the cleat hopper plates 6' and 7' upon this side as will be understood in referring to Fig. 1. Projecting from the guide rail 90 are the arms 85' to which the other ends of the arms 84 are secured as shown in Fig. 4. Projecting from the shoe 80 are the parallel extending webs $s$, as clearly shown in Fig. 1, and pasing through suitable openings within these webs s are the guide rods 87, secured to the yielding presser strip 94, held parallel to the adjustable guide rail 90, the springs r being interposed to normally force the presser strip 94 against the rail 90. As shown in Fig. 1 the inner ends of both of the members 90 and 94 are flared outward, so that the cleats will readily enter the channel formed by means of these two members 90 and 94 upon one side.

Upon the opposite side I use a similar yielding presser strip 94, from which extend the guide rods 88, which also pass through the webs s, and are provided with the interposed springs r, as shown in Fig. 1, the member 94 being held in spring-pressed condition against the guide flange 86. The inner end of this last mentioned presser strip 94 is also flared outward, as shown in Fig. 1, to permit the ready entry of the cleats.

As shown in Fig. 1, the adjustable rail 90 is provided with the threaded stems x, which pass through the ears 92 and carry the springs 91, so that the position of this member 90 can be accurately adjusted by means of suitable nuts upon the threaded stems x, in the manner shown.

Loosely held upon the main driving shaft A is a driving pulley 95 in belt connection with any motive power. This pulley 95 has a clutch collar arranged for engagement with the clutch collar 96, splined to the shaft A, and actuated by means of an operating lever 97, shown in Fig. 4.

Whenever the collar 96 is in engagement with the pulley collar, the mechanism is brought into operation.

From the foregoing it will be noticed that I provide a duplex nailing machine with a feeding mechanism, enabling a box end with two cleats being fed below the hammers, and held there while being nailed. After the cleats have been nailed to the box ends, the finished box ends will remain in place and are pushed forward by means of the following box ends entering upon the nailer tables. From the nailer tables the finished box ends are directed down a suitable chute H, shown in dotted lines in Figs. 2 and 3.

The hammers used in connection with the nailer have a predetermined excursion, so that when the thickness of the stock and cleats is varied, the nailer tables E and E' must be raised or lowered. This raising and lowering of the nailer tables makes the pivotal connection of the feeding table necessary which, as described, is accomplished by means of the slotted ear 33 and the bolt 33'.

The mechanism is simple in construction, and both durable and efficient in operation, and the various adjustments can be effected with ease, accuracy and despatch.

Having thus described my said invention what I claim as new and desire to secure by U. S. Letters Patent is:

1. The combination in a nailing machine, of a table, a stock hopper above said table, a feed plate reciprocating within said hopper, means to reciprocate said plate, an adjustably secured stop bar, two cleat hoppers secured in parallel spaced relation one cleat hopper located above said stop bar, and an adjustable ejector reciprocating between and below said cleat hoppers, as, and in the manner set forth.

2. The combination with a duplex nailing machine, of a table, a stock hopper, a feed plate reciprocating within said hopper, means to reciprocate said plate, an adjustably secured stop bar, two cleat hoppers secured in parallel spaced relation, one of said cleat hoppers located above said stop bar, an adjustable ejector reciprocating between and below said cleat hoppers, and means to reciprocate said ejector.

3. The combination with a duplex nailing machine, of a table, means to adjustably support said table, a stock hopper, a feed plate reciprocating within said hopper, means to reciprocate said plate, an adjustably secured stop bar, two cleat hoppers secured in parallel spaced relation, one of said cleat hoppers located above said stop bar, an adjustable ejector reciprocating between and below said cleat hoppers, two ejector rails secured to said ejector and arranged to reciprocate within said cleat hoppers, and means to reciprocate said ejector.

4. A cleat hopper including in combination, an adjustable plate, straps vertically secured to said adjustable plate in spaced relation and in sets of twos, two upper and two lower slotted guide bars, bolts passing through the slots of said guide bars and through said straps and plate, flange plates secured to the lower ends of the lower set of said slotted guide bars, the flanges of which project toward one another, and hopper ends having slotted enlargements clamped between said slotted guide bars and held upon said bolts, one of said hopper ends being adjustable, as and for the purpose set forth.

5. A cleat hopper including in combination, an adjustable plate, straps vertically secured to said adjustable plate in spaced relation and in sets of twos, two upper and two lower slotted guide bars, bolts passing through the slots of said guide bars and through said straps and plate, flange plates secured to the lower ends of the lower set of said slotted guide bars, the flanges of which project toward one another, hopper ends having slotted enlargements clamped between said slotted guide bars and held upon said bolts, one of said hopper ends being adjustable, a stop bar secured to said adjustable plate, and an ejector arranged to pass through said hopper between said flanges, as and for the purpose set forth.

6. In combination, two nailer table sections held in adjustable spaced relation, a guide flange fixed to one of said tables, an adjustable stop rail yieldingly secured to the other table and parallel to said fixed guide flange, a plurality of upstanding posts, a spanner bar having two parallel arms, said arms being adjustably secured to said posts, a shoe, two webs extending upward from said shoe in parallel spaced relation, two guide rods extending through said webs, a yieldable presser strip secured to the ends of said guide rods, springs interposed between said presser strip and one of said webs to force said presser strip outward, a second presser strip held parallel and adjacent to said adjustable rail, guide rods extending from said last mentioned presser strip through said webs, springs upon said last mentioned guide rods to force said traveling presser strip outward, upstanding stems extending from said shoe and passing through said spanner bar, and springs upon said stems to force said shoe downward, as and for the purpose set forth.

7. In combination, two nailer table sections held in adjustable spaced relation, a guide flange fixed to one of said tables, an adjustable stop rail yieldingly secured to the other table parallel to said fixed guide flange, a plurality of upstanding posts, a spanner bar having two parallel arms, said arms being adjustably secured to said posts, a shoe, two webs extending upward from said shoe in parallel spaced relation, two guide rods extending through said webs, a yieldable presser strip secured to the ends of said guide rods, springs interposed between said presser strip and one of said webs to force said presser strip outward, a second presser strip held parallel and adjacent to said adjustable rail, guide rods extending from said last mentioned presser strip through said webs, springs upon said last mentioned guide rods to force said traveling presser strip outward, upstanding stems extending from said shoe and passing through said spanner bar, springs upon said stems to force said shoe downward, and a cleat hopper positioned in alinement with each of said presser strips, as and in the manner set forth.

8. The combination with a duplex nailing machine, of a stock hopper, means to eject the stock from said hopper, two cleat hoppers arranged in parallel spaced relation, the stock in said hopper being arranged to be advanced into the channel formed by said two cleat hoppers, a stop bar limiting the excursion of the stock, an adjustable ejector reciprocating below and between said cleat hoppers to engage the stock forced out of said stock hopper, cleat ejecting rails secured to said ejector arranged in parallel spaced relation to eject the cleats from out of said cleat hoppers, cleat carrying flanges directed toward one another secured to the lower edge of each of said hoppers, a fixed guide flange secured in alinement with one of said cleat hoppers, an adjustably secured rail secured in alinement with the other hopper, and spring actuated yieldable presser strips located between said fixed guide flange and said adjustable rail, as and for the purpose set forth.

9. The combination with two adjustable nailer tables, of a feed table pivotally secured to said nailer tables, means to raise and lower all of said tables, a stock hopper secured to said feeding table, means to eject the stock from said hopper, two cleat hoppers arranged in parallel spaced relation, the stock in said hopper being arranged to be advanced into the channel formed by said two cleat hoppers, a stop bar secured to said feed table limiting the excursion of the stock, an adjustable ejector reciprocating below and between said cleat hoppers to engage the stock forced out of said stock hopper and advance the same upon said nailer tables, cleat ejecting rails secured to said ejector arranged in parallel spaced relation to eject the cleats from out of said cleat hoppers, cleat carrying flanges directed toward one another secured to the lower edge of each of said cleat hoppers, a guide flange fixed to one of said nailer tables in alinement with one of said cleat hoppers, an adjustably secured rail held to said other nailer table section secured in alinement with the other hopper, and spring actuated yieldable presser strips secured to said nailer tables and located between said fixed guide flange and said adjustable rail, as and for the purpose set forth.

In testimony whereof I affix my signature, in the presence of two witnesses.

PETER J. JOHNSON.

Witnesses:
 JOHN HOUSTON,
 EDWARD EGGERS.

Copies of this patent may be obtained for five cents each, by addressing the "Commissioner of Patents, Washington, D. C."